United States Patent
Chiang

(10) Patent No.: US 9,650,287 B2
(45) Date of Patent: May 16, 2017

(54) VISIBLE LIGHT AND INFRARED LIGHT TRANSMITTING OPTICAL COLORED GLASS, COMPOSITION THEREOF, AND PREPARING METHOD THEREOF

(71) Applicant: Platinum Optics Technology Inc., Taoyuan (TW)

(72) Inventor: Chih-Chun Chiang, Taoyuan (TW)

(73) Assignee: Platinum Optics Technology Inc., Taoyuan (TW)

( * ) Notice: Subject to any disclaimer, the term of this patent is extended or adjusted under 35 U.S.C. 154(b) by 245 days.

(21) Appl. No.: 14/564,788

(22) Filed: Dec. 9, 2014

(65) Prior Publication Data

US 2016/0060157 A1 Mar. 3, 2016

(30) Foreign Application Priority Data

Aug. 29, 2014 (TW) .............................. 103129960 A

(51) Int. Cl.
| | |
|---|---|
| *C03C 3/078* | (2006.01) |
| *C03C 4/02* | (2006.01) |
| *C03C 3/089* | (2006.01) |
| *C03C 4/10* | (2006.01) |
| *C03B 19/02* | (2006.01) |
| *C03B 25/02* | (2006.01) |

(52) U.S. Cl.
CPC ............... *C03C 4/02* (2013.01); *C03B 19/02* (2013.01); *C03B 25/02* (2013.01); *C03C 3/078* (2013.01); *C03C 3/089* (2013.01); *C03C 4/10* (2013.01); *C03B 2201/10* (2013.01); *C03B 2201/30* (2013.01); *C03B 2201/50* (2013.01); *C03B 2201/54* (2013.01); *C03B 2201/58* (2013.01); *C03C 2204/00* (2013.01)

(58) Field of Classification Search
CPC C03C 3/078; C03C 3/089; C03C 4/02; C03C 4/10; C03C 2203/10; C03C 2203/52; C03C 2204/00; C03B 19/02; C03B 25/02
See application file for complete search history.

(56) References Cited

U.S. PATENT DOCUMENTS

| | | | |
|---|---|---|---|
| 3,806,349 | A | 4/1974 | Matsuura |
| 4,106,946 | A | 8/1978 | Ritze |
| 5,091,115 | A | 2/1992 | Nogami |
| 8,426,241 | B2 | 4/2013 | Ahmed et al. |
| 2003/0123167 | A1 | 7/2003 | Kolberg et al. |
| 2006/0270544 | A1 | 11/2006 | Clasen et al. |
| 2012/0234391 | A1 | 9/2012 | Boussaad et al. |

*Primary Examiner* — Elizabeth A Bolden
(74) *Attorney, Agent, or Firm* — Muncy, Geissler, Olds & Lowe, P.C.

(57) ABSTRACT

The present disclosure illustrates a composition of a visible light and infrared light transmitting optical colored glass. The chalcogenide semiconductor compound $Cu_2ZnSnS_4$ or $Cu_2ZnSnSe_4$ is added in the silicate glass system composition, to adjust color and the optical property of the glass. The glass made of this composition has a characteristic of the visible light and infrared light transmitting in a wavelength of range 400 nm to 1200 nm.

17 Claims, 1 Drawing Sheet

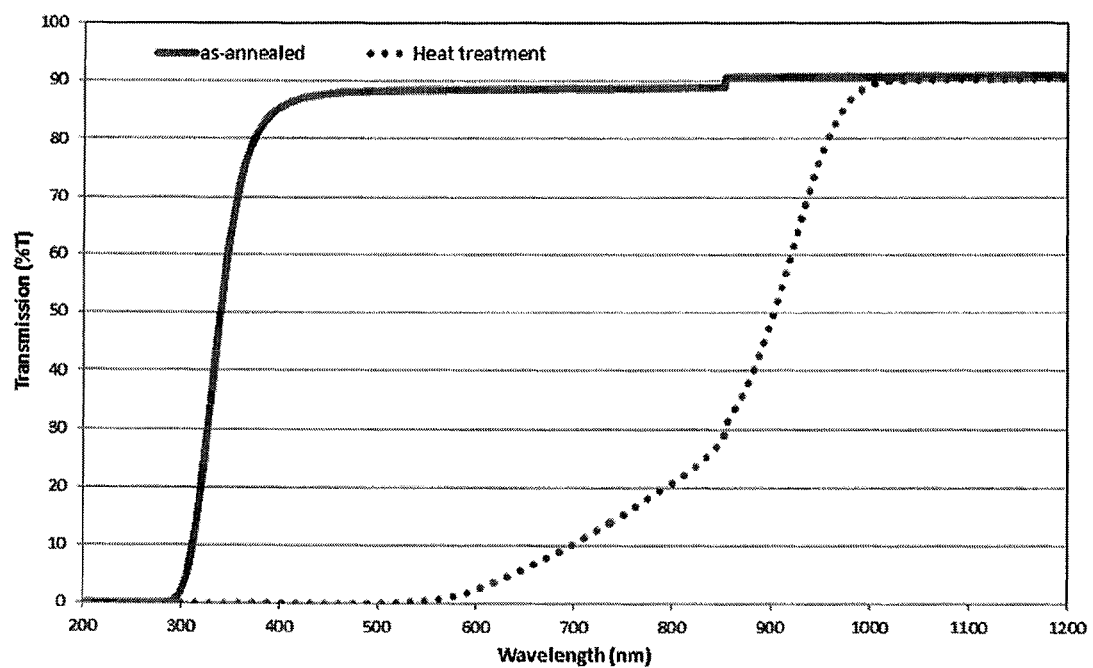

VISIBLE LIGHT AND INFRARED LIGHT TRANSMITTING OPTICAL COLORED GLASS, COMPOSITION THEREOF, AND PREPARING METHOD THEREOF

CROSS-REFERENCE TO RELATED APPLICATION

This application claims the benefit of Taiwan Patent Application No. 103129960, filed on Aug. 29, 2014, the disclosure of which is incorporated herein in its entirety by reference, in the Taiwan Intellectual Property Office.

BACKGROUND OF THE INVENTION

1. Field of the Invention

The present disclosure relates to an optical colored glass, composition of the colored glass, and a preparing method of the glass, more particularly, to a glass composition containing $Cu_2ZnSnS_4$ and $Cu_2ZnSnSe_4$.

2. Description of the Related Art

Patents such as U.S. Pat. Nos. 3,806,349, 4,106,946, 5,091,115, and US20060270544 have disclosed the infrared transmitting colored glass. In U.S. Pat. No. 3,806,349, CdS, Se and Te are mixed in the glass composition. In U.S. Pat. No. 4,106,946, CdTe, ZnS, CdS, S and Se are mixed in the glass composition. In U.S. Pat. No. 5,091,115, CdS, CuCl and PbS are mixed in the glass composition. In US20060270544, CdO, and S+Se+Te are mixed in the glass composition. These glasses are characterized in adopting Pb- and Cd-based chalcogenide semiconductor compound thereof to adjust the color of the glass and light transmitting wavelength range of the glass. However, Pb- and Cd-based chalcogenide compound thereof is poison material for environment and human body.

Because Pb- and Cd-based chalcogenide compound thereof has poison for environment and human body, patent US20030123167 disclosed a Pb-free and Cd-free glass composition, but containing I-III-VI group semiconductor compound, monovalent I group element including Cu and Ag, trivalent III group element including Al, In and Ga, and hexavalent VI group element including S, Se, and Te. Such glass does not contain hazardous material, but Ag and In are precious metal and strategic material which are very expensive and not suitable for mass production of the optical glass.

SUMMARY OF THE INVENTION

Objective of the present disclosure is to use a semiconductor compound which is never applied in glass, in a silicate glass system to adjust color and filter effect of the glass, so as to achieve the purpose of visible light and infrared light transmitting the glass. The glass can be used in night-vision photograph system, and various visible light and infrared light transmitting display apparatuses.

The present disclosure provides a visible light and infrared light transmitting optical colored glass which has a physical characteristic of visible light and infrared light transmitting in a wavelength of range 400 nm to 1200 nm.

The present disclosure provides a composition of visible light and infrared light transmitting optical colored glass. The chalcogenide semiconductor compound $Cu_2ZnSnS_4$ or $Cu_2ZnSnSe_4$ is added in silicate glass system composition, to adjust color and optical property of the glass for achieving the physical characteristics of the glass.

The present disclosure provides a preparing method for the visible light and infrared light transmitting optical colored glass. The silicate glass composition containing $Cu_2ZnSnS_4$ or $Cu_2ZnSnSe_4$ is mixed uniformly and then placed in a crucible. The crucible is placed in a furnace containing air or reducing gas at temperature between 1250° C. and 1550° C., to obtain homogenized melted glass. The melted glass is cast in a metal or graphite mold, and the optical colored glass annealing temperature and time are controlled. The optical colored glass has a characteristic of transmittance of visible light and infrared light in a wavelength of range 400 nm to 1200 nm reaching 90%.

The present disclosure provides a preparing method for the visible light and infrared light transmitting optical colored glass. The silicate glass composition containing $Cu_2ZnSnS_4$ and $Cu_2ZnSnSe_4$ is mixed uniformly and then placed in a crucible. The crucible is placed in a furnace containing air or reducing gas at temperature between 1250° C. and 1550° C., to obtain homogenized melted glass. The melted glass is cast in a metal or graphite mold, the optical colored glass annealing and reheat treatment temperature and time are controlled. The optical colored glass has a characteristic of visible light and infrared light transmitting in a wavelength of range 600 nm to 1200 nm.

The thickness of the glass of the present disclosure is ranged 0.1 mm to 1 mm.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

The FIGURE is a transmission optical spectrum of the glass of the present disclosure measured by using spectrometer.

DETAILED DESCRIPTION OF THE PREFERRED EMBODIMENTS

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Visible light and infrared light transmitting optical colored glass composition of the present disclosure includes the following components: (wt %)

SiO$_2$: 40-70;
B$_2$O$_3$: 0-10;
Na$_2$O: 0-30;
K$_2$O: 0-30;
CaO: 0-30;
MgO: 0-30;
SrO: 0-30;
BaO: 0-30;
ZnO: 10-30; and
ZnS: 0.5-5 wt % and Cu$_2$ZnSnS$_4$: 0.1-5 wt %.

The ZnS and Cu$_2$ZnSnS$_4$ can be substitute by ZnSe and Cu$_2$ZnSnSe$_4$.

The alkali metal oxide Na$_2$O, K$_2$O can be substituted by Li$_2$O, Rb$_2$O, Cs$_2$O.

SiO$_2$ is the main component of the glass, when the glass contains too less SiO$_2$, the thermal stability of the glass is bad; when the glass contains too much SiO$_2$, the melting temperature of the glass is relatively increased.

Addition of B$_2$O$_3$ can increase high-temperature fusion of the glass, and stabilize the structure of the glass.

Addition of Na$_2$O and K$_2$O alkali metal oxide can reduce high-temperature viscosity of the glass, but the glass containing too much Na$_2$O and K$_2$O alkali metal oxide (exceeding 30 wt %) may reduce chemical stability.

The alkaline earth metal oxide, such as CaO, MgO, SrO and BaO, can improve the thermal stability of the glass, but too much alkaline earth metal oxide (exceeding 30 wt %) may make the glass produce phase separation in the subsequent heat treatment process, and the optical stability of the glass is reduced.

ZnO can improve stability of the glass, and make the glass be colored uniformly, but too much ZnO (exceeding 30 wt %) makes the glass produce phase separation in the subsequent heat treatment process, and the optical stability of the glass is reduced.

ZnS and ZnSe are used to stabilize Cu$_2$ZnSnS$_4$, Cu$_2$ZnSnSe$_4$ compound.

Cu$_2$ZnSnS$_4$ and Cu$_2$ZnSnSe$_4$ can be used to adjust the wavelength range of light transmission of the glass.

An preferred embodiment of composition of the present disclosure is: SiO$_2$ 45.72 wt %, B$_2$O$_3$ 6.03 wt %, Na$_2$O 5.45 wt %, K$_2$O 19.52 wt %, CaO 1.11 wt %, MgO 0.61 wt %, SrO 0.65 wt %, BaO 2.25 wt %, ZnO+ZnS=17.5 wt %, Cu$_2$ZnSnS$_4$ 1.16 wt %.

Other preferred embodiment of composition of the present disclosure is: SiO$_2$ 45.72 wt %, B$_2$O$_3$ 6.03 wt %, Na$_2$O 5.45 wt %, K$_2$O 19.52 wt %, CaO 1.11 wt %, MgO 0.61 wt %, SrO 0.65 wt %, BaO 2.25 wt %, ZnO+ZnSe=17.5 wt %, Cu$_2$ZnSnSe$_4$ 1.16 wt %.

The components are mixed uniformly, and the mixture is then placed in Pt or ceramic crucible. The crucible filled raw materials is placed in a furnace containing air or reducing gas, and the raw materials are melted at temperature between 1250° C. to 1550° C. to obtain the homogenized glass. The melted glass is cast into a metal or graphite mold, and processed annealing once or incorporating with reheat treatment, to obtain an optical colored glass with specific wavelength cut-off. The operating condition of annealing is temperature 480° C. lasted for 1 hour and then the furnace being cooled to room temperature, and then annealing once. The obtained optical colored glass has a characteristic of transmission rate of visible light and infrared light in a wavelength of range 400 nm to 1200 nm reaching 90%, and visual color of the optical colored glass is light yellow color.

The operating condition of the reheat treatment is temperature 500° C. to 700° C. lasted for 10 minutes to 40 hours. The preferred operating condition is temperature 580° C. lasted for 20 hours. The furnace is cooled to the room temperature after the reheat treatment. By reheat treatment after annealing once, the obtained optical colored glass has a characteristic of visible light and infrared light transmitting in wavelength of range 600 nm to 1200 nm, and the visual color of the optical colored glass is black.

By annealing once, or further the heat treatment after the annealing, the glass still retains the above physical characteristics at thickness of range 0.1 mm to 1 mm. The FIGURE shows a transmission optical spectrum of the glass of the present disclosure measured by a spectrometer.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A visible light and infrared light transmitting optical colored glass composition, comprising:
SiO$_2$: 40-70 wt %;
B$_2$O$_3$: 0-10 wt %;
Na$_2$O: 0-30 wt %;
K$_2$O: 0-30 wt %;
CaO: 0-30 wt %;
MgO: 0-30 wt %;
SrO: 0-30 wt %;
BaO: 0-30 wt %;
ZnO: 10-30 wt %; and
ZnS: 0.5-5 wt % and Cu$_2$ZnSnS$_4$: 0.1-5 wt %.

2. The composition according to claim 1, wherein the ZnS and the Cu$_2$ZnSnS$_4$ can be substituted by ZnSe and Cu$_2$ZnSnSe$_4$.

3. The composition according to claim 1, wherein the Na$_2$O and K$_2$O can be substituted by Li$_2$O, Rb$_2$O, or Cs$_2$O.

4. The composition according to claim 1, wherein SiO$_2$ is 45.72 wt %, B$_2$O$_3$ is 6.03 wt %, Na$_2$O is 5.45 wt %, K$_2$O is 19.52 wt %, CaO is 1.11 wt %, MgO is 0.61 wt %, SrO is 0.65 wt %, BaO is 2.25 wt %, ZnO+ZnS is 17.5 wt %, and Cu$_2$ZnSnS$_4$ is 1.16 wt %.

5. The composition according to claim 1, wherein SiO$_2$ is 45.72 wt %, B$_2$O$_3$ is 6.03 wt %, Na$_2$O is 5.45 wt %, K$_2$O is 19.52 wt %, CaO is 1.11 wt %, MgO is 0.61 wt %, SrO is 0.65 wt %, BaO is 2.25 wt %, ZnO+ZnSe is 17.5 wt %, and Cu$_2$ZnSnSe$_4$ 1.16 wt %.

6. A glass made of composition according to claim 1, the glass having characteristic of transmitting of visible light and infrared light in wavelength of range 400 nm to 1200 nm.

7. The glass according to claim 6, wherein transmission rate of visible light and infrared light in wavelength of range 400 nm to 1200 nm is 90%.

8. The glass according to claim 7, wherein visual color of the glass is light yellow color.

9. The glass according to claim 6, wherein the wavelength is ranged from 600 nm to 1200 nm.

10. The glass according to claim 9, wherein visual color of the glass is black.

11. The glass according to claim 6, wherein thickness of the glass is 0.1 mm to 1 mm.

12. A preparing method of glass by composition of claim 1, comprising:

mixing the composition uniformly, and placing the mixture in a crucible;

placing the crucible in a furnace containing air or reducing gas at a temperature between 1250° C. and 1550° C. to obtain the homogenized melted glass;

casting the melted glass in a mold, and controlling an optical colored glass annealing temperature and time, wherein the optical colored glass has a characteristic of transmission rate of visible light and infrared light in a wavelength of range 400 nm to 1200 nm reaching 90%.

13. The method according to claim 12, wherein an operating condition of the annealing is temperature 480° C. lasted for 1 hour and then the furnace being cooled to a room temperature.

14. A preparing method of glass by composition of claim 1, comprising:

mixing the composition uniformly, and placing the mixture in a crucible;

placing the crucible in a furnace containing air or reducing gas at a temperature between 1250° C. and 1550° C. to obtain the homogenized melted glass;

casting the melted glass in a mold, and controlling an optical colored glass annealing and reheat treatment temperature and time, wherein the optical colored glass has a characteristic of visible light and infrared light transmitting in a wavelength of range 600 nm to 1200 nm.

15. The method according to claim 14, wherein an operating condition of the annealing is temperature 480° C. lasted for 1 hour and the furnace being then cooled to a room temperature.

16. The method according to claim 14, wherein an operating condition of the reheat treatment is temperature 500° C. to 700° C. lasted for 10 minutes to 40 hours, and the furnace being then cooled to a room temperature after a reheat treatment.

17. The method according to claim 16, wherein an operating condition of the reheat treatment is temperature 580° C. lasted for 20 hours and the furnace being then cooled to a room temperature.

* * * * *